United States Patent [19]

Puig

[11] Patent Number: 4,732,742

[45] Date of Patent: Mar. 22, 1988

[54] PROCESS FOR THE PRODUCTION AT A HIGH LEVEL OF PRODUCTIVITY OF ALUMINUM TRIHYDROXIDE IN A HIGH STATE OF PURITY AND WITH A MEDIAN DIAMETER OF LESS THAN 4 MICROMETERS, WHICH IS REGULATED AS REQUIRED

[75] Inventor: Jean-Philippe Puig, Aix en Provence, France

[73] Assignee: Aluminum Pechiney, France

[21] Appl. No.: 940,858

[22] Filed: Dec. 12, 1986

[30] Foreign Application Priority Data

Dec. 17, 1985 [FR] France .................. 85 19545

[51] Int. Cl.$^4$ .................................. C01F 3/02
[52] U.S. Cl. .................................. 423/119; 423/124; 423/624
[58] Field of Search .................. 423/119, 124, 629

[56] References Cited

U.S. PATENT DOCUMENTS

| | | | |
|---|---|---|---|
| 2,549,549 | 4/1951 | Wall | 423/129 |
| 3,607,140 | 9/1971 | Miller et al. | 423/121 |
| 3,838,980 | 10/1974 | Gnyra | 423/121 |
| 3,906,084 | 9/1975 | Gnyra | 423/629 |
| 4,574,074 | 3/1986 | Cristol et al. | 423/121 |
| 4,582,697 | 4/1986 | Cristol et al. | 423/629 |
| 4,617,179 | 10/1986 | Veyrier | 423/629 |

FOREIGN PATENT DOCUMENTS

| | | | |
|---|---|---|---|
| 1290582 | 3/1962 | France | 423/629 |
| 2041750 | 2/1971 | France | 423/629 |
| 7601805 | 1/1976 | France | 423/629 |
| 799243 | 8/1958 | United Kingdom | 423/629 |

Primary Examiner—Patrick P. Garvin
Assistant Examiner—Paige C. Harvey
Attorney, Agent, or Firm—Jones, Day, Reavis & Pogue

[57] ABSTRACT

A process for the production of pure aluminum trihydroxide having a controlled median diameter of less than 4 microns with a unimodal distribution and a minimum deviation. The process comprises contacting, for a short time, sodium aluminate solution with a small quantity of ground aluminum trihydroxide having a specific BET surface area of at least 8 m$^2$/g, separating the sodium aluminate solution from the solid phase comprising ground aluminum trihydroxide and aluminum trihydroxide precipitate containing impurities, then decomposing the purified sodium aluminate solution in the presence of a quantity of pure ground aluminum trihydroxide from a preceding decomposition operation to precipitate a very pure aluminum trihydroxide having the specified median diameter.

9 Claims, 1 Drawing Figure

PROCESS FOR THE PRODUCTION AT A HIGH LEVEL OF PRODUCTIVITY OF ALUMINUM TRIHYDROXIDE IN A HIGH STATE OF PURITY AND WITH A MEDIAN DIAMETER OF LESS THAN 4 MICROMETERS, WHICH IS REGULATED AS REQUIRED

TECHNICAL FIELD

The invention concerns a process for the production at a high level of productivity of aluminium trihydroxide in a high state of purity and with a median diameter of less than 4 micrometers, with unimodal distribution and a low degree of dispersion, which is regulated as required. It involves double decomposition of a supersaturated liquor of sodium aluminate from the Bayer cycle, in the presence of a crushed trihydroxide seed of a BET specific surface area which is at least equal to 8 $m^2/g$. This invention is in respect of an improvement in U.S. Pat. No. 4,574,074.

THE PROBLEM SET

It has long been known to provide for the precipitation of aluminium trihydroxide from a supersaturated solution of sodium aluminate by the addition of a seed formed by previously crystallised aluminium trihydroxide as spontaneous generation of crystalline seeds within such a solution is found to be extremely slow and difficult to achieve and indeed even non-existent according to the conditions in respect of temperature and concentration of the medium being treated.

It is for that reason that it is general practice in the Bayer process to promote the precipitation of aluminium trihydroxide from supersaturated solutions of sodium aluminate resulting from the alkaline attack on aluminium-bearing ores by virtue of recycling of a substantial fraction of the aluminium trihydroxide produced in a previous cycle.

However, in the form in which it is carried into effect, that seeding process not only involves recycling a very substantial amount of previously precipitated aluminium trihydroxide but in particular it results in the production of grains of aluminium trihydroxide in respect of which the granulometric characteristics and chemical purity do not satisfy the requirements in respect of certain applications, as for example fire-proofing fillers for synthetic polymers, mild abrasives in cosmetology and in particular alumina-based ceramics in respect of which the conditions of production first of all and then the levels of performance in use depend primarily on the physical-chemical characteristics of the alumina powders used.

For that purpose, the man skilled in the art wants to be able to produce aluminium trihydroxide in a high state of purity and in which the distribution in respect of sizes of grains is very close and centered on a median diameter which is generally less than 4 micrometers without thereby the conditions for the production of such an aluminium trihydroxide, by virtue of their complexity and in particular their low level of productivity, making the process economically unviable.

STATE OF THE ART

Among the solutions known to the man skilled in the art, some require the use of mechanical means while others involve chemical resources, but none makes it possible to produce aluminium trihydroxide which fully complies with the triple criteria in respect of purity, close and fine granulometry and a high level of productivity.

Thus, French patent FR-A-2 298 510 claims the production of an aluminium hydroxide which is intended for cosmotology and in which the mean diameter is between 1 and 25 micrometers, by crushing a coarse hydroxide, in the presence of an organic acid. If such a process can be used for the production of aluminium hydroxide with a mean diameter of greater than 15 micrometers, the effectiveness thereof for attaining diameters of smaller than 10 micrometers becomes debatable, having regard to the level of energy consumption and the crushing means to be used in the course of industrial protection, without having taken account of the necessary initial operation for purifying the aluminium hydroxide if it is produced directly from the conventional Bayer cycle.

Among the processes using chemical means, most thereof provide for the preparation of a seed comprising grains which are very fine and of regular size, which is then used for decomposition of a supersaturated solution of sodium aluminate.

Thus, patent FR-A-1 290 582 provides for precipitating a gel by sudden and abrupt dilution of a highly concentrated sodium aluminate solution. The gel formed by small spheres which are expanded with water, containing numerous microscopic aluminium hydroxide seeds constitutes the seed material. In patent FR-A-2 041 750 the fine seed material is produced in two steps, firstly precipitating a gel by concentration of a sodium aluminate solution which is then converted into a stable crystalline phase by bringing said gel into contact with a supersaturated sodium aluminate solution. A similar procedure is also described in U.S. Pat. No. 2,549,549.

Those chemical processes have the common factor that it is not possible perfectly to control the size of the particles of the seed material by virtue of the poor level of reproducibility of the qualities of the gel and its lack of stability in respect of time. Such aspects result in significant variations in granulometry of the aluminium trihydroxide precipitated from such types of seeds. Moreover, the problems of purity and productivity are not taken into consideration.

U.S. Pat. No. 3,838,980 completes the effect of refining the granulometry of aluminium trihydroxide which is precipitated from a fine seed, by a final operation of crushing the roasted alumina in order to reduce the size of the elementary grains to less than 5 micrometers. That patent also discloses the elimination of a significant fraction of the sodium and fluorine ions which are usually trapped in the structure of the aluminium trihydroxide upon precipitation thereof from a coarse seed. However, no attention is directed to the elimination of the impurities present in the state of micro-particles of oxides, hydrates or metal salts of iron, calcium, zinc, titanium, lead, silicon etc., in the supersaturated solution to be decomposed, nor the yield and productivity aspects of the process.

U.S. Pat. No. 4,574,074 in respect of which the present application is for an improvement provides a satisfactory solution to the problem of controlling the granulometry of the aluminium trihydroxide upon precipitation thereof, in particular for producing particles of less than 4 micrometers, in which the distribution of sizes of grains is very tight, while retaining a high level of productivity, close to 80 grams of alumina per liter of solution. That result is obtained by decomposition of a supersaturated solution of sodium aluminate in the presence of a seed of crushed aluminium trihydroxide whose BET specific surface area is at least equal to 8 m$^2$/g. In that way, the characteristics of the seed are controlled and, taking account of the large specific surface thereof, small amounts of seed suffice to precipitate an aluminium trihydroxide which is at a higher level of fineness than the crushed seed, which is a surprising effect. Here too however the level of purity of the precipitated trihydroxide is found to be inadequate for a certain number of uses.

From the point of view of the man skilled in the art therefore the adaptation of a process for purifying supersaturated solutions of sodium aluminate which come from the Bayer cycle is a necessity before carrying into effect any process for the precipitation of fine-grain aluminium trihydroxide, even if with a satisfactory level of productivity, in accordance with U.S. Pat. No. 4,574,074. The choice is restricted by virtue of the fact that it is difficult to effect separation by filtration of micro-suspensions of impurities (Fe$_2$O$_3$, TiO$_2$, SiO$_2$, etc.), in a solid or colloidal state, from hot supersaturated solutions of sodium aluminate. That is due both to the volumes of solution to be treated and the limited stop thresholds which can be reasonably attained, even with the use of filtration and flocculating adjuvants.

One procedure involving trapping the microsuspensions of impurities on a seed which is in an activated condition by the beginnings of decomposition of the supersaturated solution of sodium aluminate is described in British patent No. 799 243 and U.S. Pat. No. 3,607,140. Very substantial reductions in the amounts of iron and titanium are achieved by fixing such impurities on the activated seed which, acting as a trapping agent, has to be frequently removed from the circuit in order to be purified and recycled or quite simply dumped. Having regard to the amounts of seeds to be used (30 g/l to more than 300 g/l) and to be regenerated or dumped on a periodic basis, such processes are found to be expensive to operate and the levels of productivity thereof remain relatively low (less than 60 g of Al$_2$O$_3$ per liter of solution) in the final decomposition operation.

SUBJECT OF THE INVENTION

It is for that reason that, aware of the above-indicated disadvantages, the applicant in continuing his research discovered a process for the production at a high level of productivity of aluminium trihydroxide in a high state of purity with a median diameter which is regulated as required to a value of less than 4 micrometers, with unimodal distribution and a low degree of dispersion, constituting an improvement in U.S. Pat. No. 4,574,074.

The process according to the invention comprising effecting decomposition of a supersaturated solution of sodium aluminate in the presence of an aluminium trihydroxide seed is characterised by the following steps:

(a) An initial step referred to as the "pre-decomposition" step comprises bringing together the supersaturated solution of sodium aluminate to be decomposed, with a level of concentration of dissolved Na$_2$O of between 150 g/l and 250 g/l with a ratio by weight between the concentrations of dissolved Al$_2$O$_3$ and dissolved Na$_2$O of between 0.9 and 1.3, for a period of between 1 hour and 5 hours, with agitation and at a temperature of between 70° C. and 90° C., and a small amount of seed of crushed aluminium trihydroxide, with a BET specific surface area which is at least equal to 8 m$^2$/g and in a proportion of from 1 g to 10 g of Al$_2$O$_3$ per liter of solution;

(b) At the end of the pre-decomposition step, in the suspension which is thus formed and using any process known to the man skilled in the art, the liquid phase is separated from the solid phase formed by impure aluminium trihydroxide which is eliminated;

(c) In the liquid phase formed by the purified supersaturated solution of sodium aluminate in which the ratio by weight between the concentrations of dissolved Al$_2$O$_3$ and dissolved Na$_2$O must then be between 0.8 and 1.2, the level of concentration of dissolved Na$_2$O is regulated if necessary by dilution to between 100 g/l and 200 g/l;

(d) There is then effected in known manner the step for decomposition of the purified supersaturated solution of sodium aluminate, in the presence of a crushed seed of purified aluminium trihydroxide from a preceding decomposition cycle, with a BET specific surface area which is at least equal to 8 m$^2$/g, in order to form with agitation a suspension developing a surface area of at least 100 m$^2$ per liter of supersaturated solution of sodium aluminate at a temperature of between 30° C. and 80° C.; said decomposition step being continued until a final ratio by weight of the levels of concentration of dissolved Al$_2$O$_3$ and dissolved Na$_2$O of at most 0.7 is obtained;

(e) Separation is effected by means of any process known to the man skilled in the art, in the suspension resulting from the decomposition step, in respect of the liquid phase formed by the decomposed sodium aluminate solution and the solid phase formed by purified aluminium trihydroxide, a fraction of which is intended for the production while the other fraction is recycled as a seed after crushing.

When the applicant carried out decomposition tests with agitation on supersaturated solutions of sodium aluminate in the presence of a seed comprising aluminium trihydroxide with a high BET specific surface area developed by crushing from an original value of 0.1 m$^2$/g to more than 8 m$^2$/g, he noted, independently of the refining effect of the precipitated trihydroxide, a substantial trapping effect, comparable to adsorption, of the micro-particles in suspension in the solution to be decomposed, that effect occurring in the presence only of a small amount of crushed seed with a developed area of more than 8 m$^2$/g. In addition, that trapping effect is further accentuated at the very beginning of decomposition of the supersaturated solution by the uniform appearance of fresh seeds of aluminium trihydroxide and therefore fresh contact surfaces within the suspension. Thus after 1 to 3 hours of decomposition, corresponding to the precipitation of 5 to 15% of the alumina in solution, there was obtained, after separation of the solid phase, a degree of elimination of the impurities in the pre-decomposed supersaturated solution, or "purification rate", of about 90% by weight in respect of impurities such as Se, Ca, Zn initially present in the supersaturated solution. In fact, the micro-particles in suspension in the solid or colloidal state are generally oxides, hydrates or metal salts of iron, calcium, titanium, zinc, lead and silicon which, by virtue of their extreme fineness, it has not been possible to separate from the liquid phase by settlement and filtration after an alkaline attack operation on bauxite. They can also be formed by precipitation in the course of the dilution and cooling operations which accompany settlement and separation of the liquor after the attack operation.

The applicant also determined the conditions which are the most favourable for the production of an aluminium trihydroxide in a high state of purity, with a median diameter of smaller than 4 micrometers, with a tight granulometry, while retaining a level of productivity of at least 75 grams of alumina per liter of decomposed solution.

Thus, the surface area developed by crushing of the aluminium trihydroxide used as a seed, both in the pre-decomposition step and in the step for decomposition of the supersaturated solution of sodium aluminate, must preferably be between 10 $m^2/g$ and 25 $m^2/g$.

Moreover, the aluminium trihydroxide used after crushing as a seed in the step for pre-decomposition of the supersaturated solution of sodium aluminate may come from any source of production of aluminium trihydroxide or preferably the decomposition step of the process according to the invention.

The operation of crushing the aluminium trihydroxide used as the seed in the pre-decomposition step, which is carried out by means of any apparatus known to the man skilled in the art, can be effected in the dry condition or in suspension in an aqueous or alcohol medium.

The supersaturated sodium aluminate solution treated in accordance with the process of the invention and in which the level of concentration of sodium hydroxide is between 150 g/liter and 250 g/liter expressed in respect of caustic $Na_2O$, has a ratio in respect of concentration by weight of dissolved $Al_2O_3$ in g/l to dissolved $Na_2O$ in g/l, which is preferably between 0.9 and 1.3. The period of time for which said solution is brought into contact with the crushed trihydroxide seed, at a temperature of between 70° C. and 90° C. and with agitation in the pre-decomposition step is preferably from 1 to 3 hours and in a proportion of 25 $m^2$ to 150 $m^2$ of developed BET surface area, per liter of supersaturated solution. At the end of the pre-decomposition step the suspension is filtered, the solid phase charged with impurities is taken out of circuit for regeneration or dumping while the liquid phase formed by the purified sodium aluminate solution is passed to the decomposition step. Monitoring of the amounts of the main impurities in the supersaturated solutions of sodium aluminate before and after the pre-decomposition step show purification rates of higher than 95% for Fe and Ca and higher than 80% for Zn.

Prior to the decomposition step, the purified supersaturated sodium aluminate solution in which the ratio by weight between the concentrations of dissolved $Al_2O_3$ in g/liter and dissolved $Na_2O$ in g/liter must then be between 0.8 and 1.2 but preferably between 1 and 1.2 is diluted if necessary to keep its concentration of dissolved $Na_2O$ between 100 g/l and 200 g/l. The solution to undergo decomposition is then brought into contact with agitation with the seed of purified and crushed aluminium trihydroxide which is taken from the decomposition step of a preceding cycle. It should be noted that, like the seed in the pre-decomposition step, the seed in the decomposition step can be crushed in the dry condition or in suspension in an aqueous or alcohol medium using any apparatus known to the man skilled in the art until the BET specific surface area required by the process is obtained.

In the decomposition step, the amount of crushed seed of aluminium trihydroxide introduced into the supersaturated solution of sodium aluminate to undergo decomposition is such that the total developed surface area thereof is between 100 and 600 $m^2$ per liter and preferably between 200 $m^2$ and 400 $m^2$ per liter of solution to be decomposed with agitation and at a temperature of between 30° C. and 80° C. and preferably between 40° C. and 60° C. until the attainment of a ratio by weight of concentration of dissolved $Al_2O_3$ in g/liter to dissolved $Na_2O$ in g/liter of between 0.35 and 0.65 but preferably between 0.40 and 0.60. After separation of the solid phase by filtration, there is obtained with a level of productivity of at least 73 g of $Al_2O_3$ per liter of solution, an aluminium trihydroxide in respect of which the median diameter is lower than 4 micrometers with a tight granulometry and in which the amount of impurities is very small.

| | Fe | Si | Zn | Ti | Pb | V | P |
|---|---|---|---|---|---|---|---|
| ppm/$Al_2O_3$ | <10 | <20 | <2 | <5 | <1 | <2 | <2 |

The manner of carrying out the process shown in diagrammatic form in its preferred embodiment in FIG. 1 is as follows:

BRIEF DESCRIPTION OF THE DRAWING

The saturated sodium aluminate solution S1 is purified prior to decomposition by being brought into contact with agitation and at the required temperature in the pre-decomposition step 1, with the seed of crushed aluminium trihydroxide A1 which is taken as a small amount from the fraction A4 of purified aluminium trihydroxide, which is intended after crushing at 6 for preparation of the seeds A1 and A3. The suspension S2 coming from the pre-decomposition step is filtered in the station 2. The solid phase of polluted aluminium trihydroxide A2 is taken out of the circuit for regeneration or dumping. The sodium aluminate filtrate S3 is optionally diluted in the dilution station 3 to adjust the concentration of $Na_2O$. The solution S4 from the dilution station 3 is passed to the decomposition step 4 and is brought into contact with agitation and at the required temperature with crushed seed A3 of purified aluminium trihydroxide A4. The suspension S5 issuing from the decomposition step 4 is filtered in the station 5.

The filtrate S6 formed by the decomposed sodium aluminate solution is recycled to the bauxite attack operation at an upstream location while the solid phase A5 of purified aluminium trihydroxide is divided between the production A6 and the seed A4 which is intended for the preparation of crushed seeds A1 and A3 at the crushing station 6.

Figure 1:
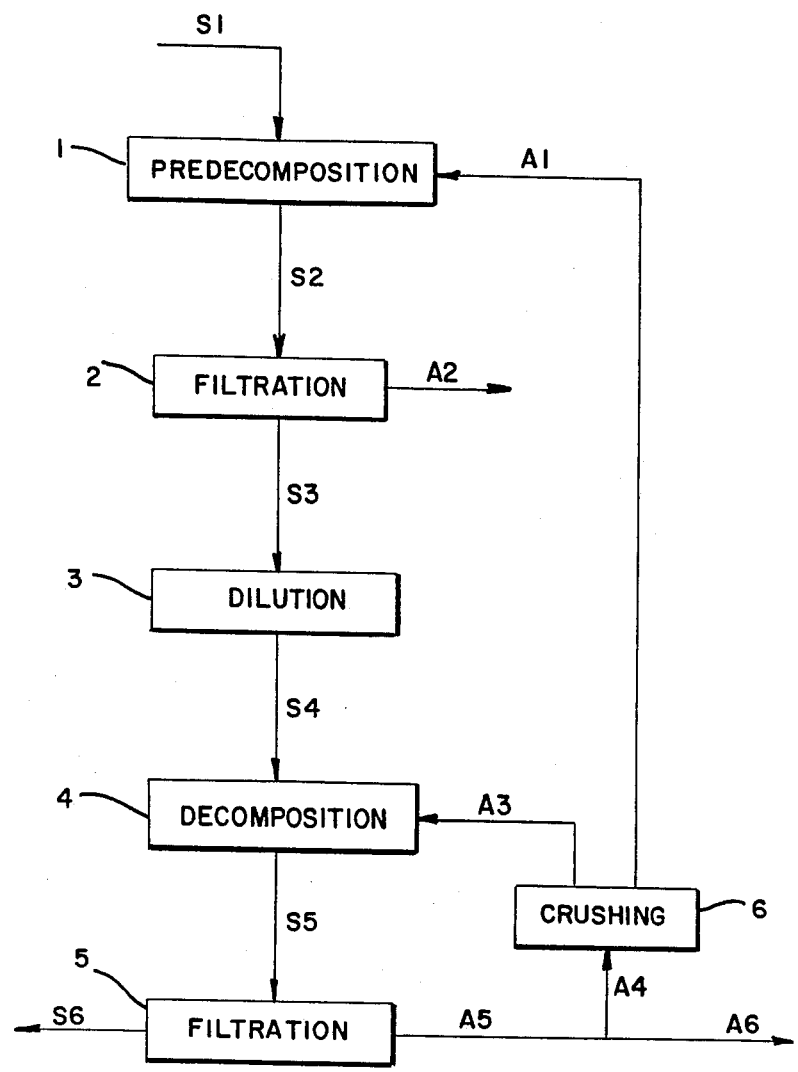

The essential features of the invention will be still more clearly appreciated by reference to the description of the following examples:

EXAMPLE 1

This Example illustrates the possibility of producing as required, using the process of the invention, aluminium trihydroxide in a high state of purity with a median diameter centered on 1 micrometer and with a tight granulometry, with a level of productivity of higher than 80 g $Al_2O_3$ per liter of solution.

For that purpose, the first step of the process according to the invention comprises taking industrial aluminium trihydroxide resulting from alkaline attack on a bauxite using the Bayer process. Then, in order to effect the crushing operation, an aqueous suspension of said aluminium trihydroxide is produced, containing 100 grams per liter of dry matter.

The crushing operation was carried out by means of an apparatus of known type made up of a cylinder with a horizontal axis of rotation and with a working diameter of 10 cm, the crushing members in which are formed corundum balls. Thus, 1 liter of the abovementioned suspension was subjected to crushing by means of 2 kilograms of balls with a diameter of 9 mm and 1 kilogram of balls with a diameter of 6 mm.

After a crushing time of 20 hours, the result obtained is crushed aluminium trihydroxide particles with a BET surface area of 15 $m^2$ per gram as measured using the method described in the standards AFNOR X-11-621 and X-11-622 while the aluminium trihydroxide had a BET surface area before crushing of 0.10 $m^2$ per gram.

Then, 2 liters of supersaturated solution of sodium aluminate with a level of concentration of caustic $Na_2O$ of 200 g/liter and a ratio by weight in respect of the concentrations of dissolved $Al_2O_3$ and dissolved $Na_2O$ of 1.2 and 10 grams of crushed aluminium trihydroxide (in the form of a suspension in water) were then introduced into a suitable reactor, in such a way as to provide a seed surface area of 75 $m^2$ per liter of supersaturated solution of sodium aluminate.

The suspension produced in that way was agitated by means of a vertical-axis agitator having wide blades, rotating at 60 revolutions per minute. The temperature of the suspension was maintained at 70° C. throughout the pre-decomposition operation which lasted for 2 hours.

At the end of the pre-decomposition operation, the ratio by weight of dissolved $Al_2O_3$ to dissolved $Na_2O$ was 1.10, indicating that 8% only of the alumina in solution had precipitated. After separation of the solid phase, the supersaturated pre-decomposed sodium aluminate solution contained the following proportions, showing the effectiveness of the purification operation by comparison in the following table with the initial proportions:

| Proportions of impurities (mg/l) | Fe | Si | Zn | Ca |
|---|---|---|---|---|
| Initial solution | 45 | 30 | 80 | 30 |
| Solution after pre-decomposition | <1 | 25 | <10 | <1 |

After dilution to 150 g/l of $Na_2O$, 2 liters of the pre-decomposed and purified solution were introduced into a suitable reactor, with 40 grams of a seed of aluminium trihydroxide which had been purified and crushed to give a BET specific surface area of 20 $m^2/g$. The aluminium trihydroxide taken off in a preceding decomposition operation on the same liquor was crushed for 32 hours in the form of an aqueous suspension in the above-described apparatus to produce a developed BET surface area of 20 $m^2/g$. The suspension developing a surface area of 400 $m^2$/liter when produced in that fashion was agitated by means of a vertical-axis agitator having broad blades and rotating at 60 revolutions per minute. The temperature of the suspension during the decomposition operation which lasted for 24 hours was 53° C.

At the end of the decomposition operation, the ratio by weight of the concentrations of dissolved $Al_2O_3$ in g/l to dissolved $Na_2O$ in g/l was 0.5, corresponding to a level of productivity of 90 grams of $Al_2O_3$ per liter of solution. After separation of the liquid phase the aluminium trihydroxide collected was of the following characteristics:

| Final proportions of impurities | Fe | Si | Zn | Ti | V | P | Ca | Ga | Li |
|---|---|---|---|---|---|---|---|---|---|
| ppm/$Al_2O_3$ | 5 | 18 | <2 | 2 | <2 | <2 | 7 | <5 | <5 |

Uranium and thorium contents were respectively of 240 ppb/$Al_2O_3$ and of 20 ppb/$Al_2O_3$.

The mean diameter D50 as measured by the sedimentation method described in the standard AFNOR X II-683 was 1.1 micrometer and all the grains were of a smaller diameter than 5 micrometers.

By way of indication, an aluminium trihydroxide of similar granulometry but precipitated under the conditions of U.S. Pat. No. 4,574,074, that is to say without the initial pre-decomposition step and using a crushed seed of non-purified aluminium trihydroxide was characterised by the following proportions of impurities:

| Proportions of impurities | Fe | Si | Zn | Ti | V | P | Ca | Ga | Li |
|---|---|---|---|---|---|---|---|---|---|
| ppm/$Al_2O_3$ | 175 | 40 | 30 | 10 | 5 | 5 | 130 | 75 | 19 |

Uranium and thorium contents were respectively of 240 ppb/$Al_2O_3$ and of 20 ppb/$Al_2O_3$.

EXAMPLE 2

This Example illustrates another possible way of producing as required, using the process of the invention, aluminium trihydroxide in a high state of purity and with a median diameter centered on 2.5 micrometers and with a tight granulometry while retaining a level of productivity of higher than 75 g of $Al_2O_3$ per liter of supersaturated solution of sodium aluminate to be decomposed.

The first step referred to as the pre-decomposition step comprises using as a seed purified aluminium trihydroxide from a preceding decomposition cycle. The crushing operation was carried out dry on 100 g of aluminium trihydroxide using the same apparatus and with the same crushing members as those used in Example 1. After 32 hours of crushing, the result obtained is particles of aluminium trihydroxide with a BET specific surface area of 20 $m^2/g$. There are then introduced into a suitable reactor, 2 liters of supersaturated solution of sodium aluminate in which the concentration of dissolved $Na_2O$ was 110 g/l and the ratio by weight of concentrations of dissolved $Al_2O_3$ and dissolved $Na_2O$ was 1.20 with 10 grams of crushed aluminium trihydroxide with a BET specific surface area of 20 $m^2/g$, so as to provide a seed area equivalent to 100 $m^2$ per liter of supersaturated sodium aluminate solution. The suspension produced in that way was agitated under the same conditions as those described in Example 1 but the temperature of the suspension was maintained at 88° C. throughout the pre-decomposition operation which lasted for 2 hours.

At the end of the pre-decomposition operation, the ratio by weight of the concentrations of dissolved $Al_2O_3$ and dissolved $Na_2O$ was 1.10, indicating that only 8% of the alumina in solution had precipitated. After separation of the solid phase, the pre-decomposed supersaturated sodium aluminate solution had the following amounts of impurities compared in the following table to the initial proportions:

| Proportions of impurities in mg/l | Fe | Si | Zn | Ca |
|---|---|---|---|---|
| Initial solution | 58 | 25 | 90 | 35 |
| Solution after pre-decomposition | <1 | 20 | <10 | <1 |

Then, 2 liters of the pre-decomposed and purified solution was introduced into a suitable reactor with 20 grams of seed of aluminium trihydroxide purified and crushed in the dry condition until giving a BET specific surface area of 20 m$^2$/g (a fraction of the dry-crushed aluminium trihydroxide had been used as a seed in the pre-decomposition step). The suspension which developed a surface area of 200 m$^2$ of area of seed per liter of solution, produced in that way, was agitated by means of a vertical-axis agitator with wide blades rotating at 60 revolutions per minute. The temperature of the suspension during the decomposition operation which lasted for 20 hours was maintained at 50° C.

At the end of the decomposition operation the ratio by weight in respect of concentrations of dissolved Al$_2$O$_3$ and dissolved Na$_2$O was 0.40, corresponding to a level of productivity of 77 g of Al$_2$O$_3$ per liter of solution.

After separation of the liquid phase, the aluminium trihydroxide collected was of the following characteristics:

| Final proportions of impurities | Fe | Si | Zn | Ti | V | P | Ca |
|---|---|---|---|---|---|---|---|
| ppm/Al$_2$O$_3$ | 6 | 15 | <2 | 2 | <2 | <2 | <5 |

Uranium and thorium contents were respectively of 16 ppb/Al$_2$O$_3$ and of 1.5 ppb/Al$_2$O$_3$.

Those results of chemical analysis are also to be compared to those set forth in Example 1 concerning an aluminium trihydroxide precipitated from a supersaturated solution of sodium aluminate in accordance with U.S. Pat. No. 4,574,074, that is to say without the initial pre-decomposition step.

The diameter D50 was 2.6 micrometers and all the grains were of a diameter of smaller than 10 micrometers.

I claim:

1. In a process for producing aluminum trihydroxide having a median diameter of less than 4 micrometers with unimodal distribution and minimum deviation comprising the steps of decomposing a supersaturated sodium aluminate solution by adding to said solution an amount of crushed aluminum trihydroxide seed having a BET specific surface area of at least 8 m$^2$/g such that the total surface area of said seed is at least 100 m$^2$ per liter of sodium aluminate solution, and agitating the resulting suspension until a weight ratio of dissolved Al$_2$O$_3$ to caustic Na$_2$O of at most 0.7 is obtained, the improvement comprising performing a pre-decomposition process prior to decomposition of the supersaturated sodium aluminate solution to remove impurities from said solution, said pre-decomposition process comprising the steps of (a) bringing a supersaturated sodium aluminate solution to be decomposed having a dissolved Na$_2$O concentration of between 150 and 250 g/l and a ratio by weight of dissolved Al$_2$O$_3$ to dissolved Na$_2$O of between 0.9 and 1.3, together with an amount of crushed aluminum trihydroxide seed having a BET specific surface area of at least 8 m$^2$/g in a proportion of from 1 to 10 g of Al$_2$O$_3$ per liter of solution, and agitating said sodium aluminate solution and said seed for a period of from 1 to 3 hours at a temperature between 70° and 90° C. to form a suspension having a liquid phase and a solid phase;

(b) separating the solid phase, comprising aluminum trihydroxide and impurities, from the liquid phase, comprising supersaturated sodium aluminate solution having a ratio by weight dissolved Al$_2$O$_3$ to dissolved Na$_2$O of between 0.8 and 1.2, whereby said supersaturated sodium aluminate solution is substantially free from impurities after said separation.

2. A process according to claim 1, wherein the crushed aluminum trihydroxide seed used in the pre-decomposition process has a BET specific surface area of between 10 m$^2$/g and 25 m$^2$/g.

3. A process according to claim 1, wherein the aluminum trihydroxide seed used in the pre-decomposition process is crushed dry.

4. A process according to claim 1, wherein the aluminum trihydroxide seed used in the pre-decomposition process is crushed in a liquid medium.

5. A process according to claim 1, wherein the aluminum trihydroxide seed is added to the supersaturated sodium aluminate in the pre-decomposition process in an amount such that the total surface area of the seed is from 25 m$^2$ to 150 m$^2$ per liter of sodium aluminate solution.

6. A process according to claim 1, wherein the purified supersaturated sodium aluminate solution resulting from the pre-decomposition process has a ratio by weight of dissolved Al$_2$O$_3$ in g/l to dissolved Na$_2$O in g/l of between 1.0 and 1.2.

7. A process according to claim 1, wherein the purified supersaturated sodium aluminate solution resulting from the pre-decomposition process is diluted to obtain a concentration of dissolved Na$_2$O of between 100 g/l and 200 g/l.

8. A process according to claim 1, wherein the aluminum trihydroxide seed used in the pre-decomposition process results from the decomposition of the purified supersaturated sodium aluminate solution.

9. A process for producing a highly pure aluminum trihydroxide having a median diameter of less than 4 micrometers with unimodal distribution and minimum deviation, from the decomposition of a supersaturated sodium aluminate solution, said process comprising the steps of (a) in a first, pre-decomposition stage, bringing a supersaturated sodium aluminate solution to be decomposed having a dissolved Na$_2$O concentration of between 150 and 250 g/l and a ratio by weight of dissolved Al$_2$O$_3$ to dissolved Na$_2$O of between 0.9 and 1.3, together with an amount of crushed aluminum trihydroxide seed having a BET specific surface area of at least 8 m$^2$/g in a proportion of from 1 to 10 g of Al$_2$O$_3$ per liter of solution, and agitating said sodium aluminate solution and said seed for a period of from 1 to 3 hours at a temperature between 70° and 90° C. to form a suspension having a liquid phase and a solid phase;

(b) separating the solid phase, comprising aluminum trihydroxide and impurities, from the liquid phase, comprising supersaturated sodium aluminate solution having a ratio by weight dissolved $Al_2O_3$ to dissolved $Na_2O$ of between 0.8 and 1.2, whereby said supersaturated sodium aluminate solution is substantially free from impurities after said separation;

(c) in a second, decomposition stage, adding to the purified supersaturated sodium aluminate solution an amount of purified crushed aluminum trihydroxide seed having a BET specific surface area of at least equal to 8 $m^2/g$ to obtain a surface area of at least 100 $m^2$ per liter of purified sodium aluminate solution, and agitating said purified sodium aluminate solution at a temperature of between 30° and 80° C. until a ratio by weight of dissolved $Al_2O_3$ to caustic $Na_2O$ of at most 0.7 is obtained, whereby said highly pure aluminum trihydroxide having a median diameter of less than 4 micrometers, with unimodal distribution and minimum deviation is precipitated.

* * * * *